United States Patent
Isobe et al.

(10) Patent No.: US 8,393,602 B2
(45) Date of Patent: Mar. 12, 2013

(54) COIL SPRING WITH IRREGULAR CROSS SECTION

(75) Inventors: Hisao Isobe, Aichi-gun (JP); Jun Matsumoto, Aichi-gun (JP)

(73) Assignee: Togo Seisakusyo Corporation, Aichi (JP)

( * ) Notice: Subject to any disclaimer, the term of this patent is extended or adjusted under 35 U.S.C. 154(b) by 208 days.

(21) Appl. No.: 12/736,596

(22) PCT Filed: Feb. 23, 2009

(86) PCT No.: PCT/JP2009/053154
§ 371 (c)(1),
(2), (4) Date: Oct. 21, 2010

(87) PCT Pub. No.: WO2009/136514
PCT Pub. Date: Nov. 12, 2009

(65) Prior Publication Data
US 2011/0031667 A1    Feb. 10, 2011

(30) Foreign Application Priority Data
May 7, 2008   (JP) .................................. 2008-121211

(51) Int. Cl.
*F16F 1/06* (2006.01)

(52) U.S. Cl. ........ 267/180; 267/166; 267/167; 267/190; 267/202; 267/204

(58) Field of Classification Search .................. 267/180, 267/166, 167, 202, 204, 190
See application file for complete search history.

(56) References Cited

U.S. PATENT DOCUMENTS

| | | | | | |
|---|---|---|---|---|---|
| 2,998,242 | A | * | 8/1961 | Schwarzbeck et al. | 267/204 |
| 4,735,403 | A | * | 4/1988 | Matsumoto et al. | 267/180 |
| 5,259,599 | A | * | 11/1993 | Hernandez | 267/180 |
| 2003/0098537 | A1 | * | 5/2003 | Krickau et al. | 267/167 |

FOREIGN PATENT DOCUMENTS

| | | |
|---|---|---|
| JP | 59190528 | 10/1984 |
| JP | 60241535 | 11/1985 |
| JP | 61167728 | 7/1986 |
| JP | 02186137 | 7/1990 |
| WO | 2006129710 | 12/2006 |

\* cited by examiner

*Primary Examiner* — Robert A Siconolfi
*Assistant Examiner* — San Aung
(74) *Attorney, Agent, or Firm* — Jacobson Holman PLLC

(57) ABSTRACT

A coil spring with irregular cross section according to the present invention is made by subjecting a coil wire having an irregular cross section to a fatigue-strength improving treatment including a shot peening treatment after coiling the coil wire into a spring configuration, and the coil spring with irregular cross section has a vertical cross sectional profile whose coil inner-peripheral-side section is expressed by following Equation (1) and Equation (2) in a polar coordinate system and orthogonal coordinate system:

$$x=(LR-\Delta b)\cos^{nxr}\theta+\Delta b \quad (1)$$

$$y=SR \sin^{nyr}\theta \quad (2)$$

wherein $\theta$ is a deflection angle in said polar coordinate system; and $0°\leq\theta<90°$, $270°\leq\theta<360°$, $0.7\leq nxr\leq 0.9$, $0.8\leq nyr\leq 1.0$, and $0.1SR\leq\Delta b\leq 0.3SR$; in said Equation (1) and Equation (2). In accordance with the present invention, it is possible to provide a coil spring with irregular cross section that exhibits more uniform and higher fatigue strength along a cross-sectional peripheral direction of the coil wire.

5 Claims, 9 Drawing Sheets

COIL SPRING WITH IRREGULAR CROSS SECTION

This is a national stage of PCT/JP09/053,154 filed Feb. 23, 2009 and published in Japanese, which has a priority of Japanese no. 2008-121211 filed May 7, 2008, hereby incorporated by reference.

TECHNICAL FIELD

The present invention relates to a coil spring; to be concrete, it relates to a coil spring that is made by subjecting coil wire with irregular cross section to fatigue-strength improving treatment after coiling the coil wire.

BACKGROUND ART

In general, a coil spring is made of a coil wire whose cross section is circular. When loads act on this type of coil spring in the axial direction of coil, surface stresses that occur on the cross-sectional periphery in the coil wire become greater on the outer peripheral side of coil than those on the inner peripheral side thereof. This is because the surface stresses, which occur on the cross-sectional periphery of this coil spring, arise when the coil wire is affected by shear forces (or forces in shearing) in addition to the influences that the coil wire is curved (namely, torsional forces). Consequently, in this type of coil spring, cracks that become the cause of breakages are likely to occur on the inner peripheral side of coil where the surface stresses become higher.

Hence, in order that the surface stresses, which occur on the cross-sectional periphery of the coil wire when loads act on the coil wire in the axial direction of coil, are biased as less as possible, a coil spring with irregular cross section has been known, coil spring which is made of a coil wire whose cross section is formed as an irregular cross section that approximates an egg shape (see Japanese Unexamined Patent Publication (KOKAI) Gazette No. 59-190,528, for instance).

As illustrated in FIG. 8, this coil spring with irregular cross section has an egg-shaped portion 81 on the inner peripheral side of coil in the vertical cross section that is taken along the axial direction of coil in a coil wire 80; and has a flattened portion 82 on the outer peripheral side of coil therein. That is, the vertical cross-sectional profile of the coil wire 80 is constituted of the curve-lined section (i.e., C-B-A-E-D) and the liner-lined section (i.e., C-D). Note that, of the vertical cross-sectional profile of the coil wire 80, the part that is the closest to the central axis of coil is adapted into an innermost side end "A" of the coil spring with irregular cross section. Moreover, in the present specification, the term, "inner peripheral side of coil," means that it is the inner peripheral side of coil (or the central side of coil spring) in the vertical cross section that is taken along the axial direction of coil in coil wire, unless otherwise specified; and the term, "outer peripheral side of coil," means that it is the outer peripheral side of coil (or the outwardly opposite side to the central side of coil spring) in the vertical cross section that is taken along the axial direction of coil in coil wire, unless otherwise specified. The gazette that describes the above coil spring sets forth that disposing the flattened portion 82 at the outermost side section in the coil spring makes it possible to make stress sharing greater on the outer peripheral side of coil when loads act thereon in the axial direction; as a result, it is possible to equalize surface stresses on the cross-sectional periphery in the coil wire 80 when loads act thereon in the axial direction.

DISCLOSURE OF THE INVENTION

Incidentally, coil springs (including springs with irregular cross section) are generally subjected to fatigue-strength improving treatments, such as shot peening treatments, in order to upgrade the fatigue strength. However, due to their stereoscopic structures (namely, the overlapping state of coil wire), parts that are likely to be subjected to shot peening treatments (namely, in the vicinity of the innermost side end "A" shown in FIG. 8, for instance), and parts that are less likely to be subjected to the treatment (namely, from the intermediate parts, which come from the innermost side end "A" toward the end "B" or end "E," to or around the end "B" and "E" shown in FIG. 8, for instance) are present in the coil springs. Consequently, it is impossible to equalize the degree of fatigue-strength improvement in the coil springs, which results from shot peening treatments, and the like, in the cross-sectional circumferential direction of the coil wires.

FIG. 9 illustrates a distribution of fatigue-strength proportions on the inner peripheral side of coil (namely, from the end "A" to the neighborhood around the end "B") when subjecting a general coil spring to a fatigue-strength improving treatment, such as shot peening. Note that, in FIG. 9, a position at which the deflection angle θ becomes 0° (namely, at the end "A") in a polar coordinate system is the closest position to the central axis of coil. Moreover, the end "B" lies at a position at which the deflection angle becomes 90°, and the end "E" lies at a position at which the deflection angle becomes 270°. Note that the "fatigue-strength proportions" are proportions between fatigue strengths, at positions at which the deflection angle is individual angles, when the fatigue strength at a position at which the deflection angle is 0° (namely, at the end "A") is taken as 1.0 (or 100%).

Moreover, as can be understood from FIG. 9, the fatigue-strength proportions decline from the side "A" (namely, the innermost side end) of coil spring toward the side of the end "B" (or the end "E") when subjecting a general coil spring to a treatment for improving fatigue strength. That is, in the cross-sectional circumferential direction of coil wire, the more it is headed for the end "B" or end "E" from a part, which is the closest to the central axis of coil (namely, the side of the end "A," or at around 0°) along the cross-sectional circumferential direction, the more the fatigue-strength improving degree declines as being accompanied by the degree of difficulty that increases in terms of shot-peening treatment. This also arises in conventional coil springs with irregular cross section similarly.

In the conventional coil spring with irregular cross section, however, no considerations are made for even such fatigue strengths as those after fatigue-strength improving treatments such as shot peening treatments, though it has been attempted to improve the bias in the distribution of surface stresses, bias which occurs when axial loads act thereon, by forming the vertical cross-sectional profile (or cross-sectional configuration) of the coil wire 80 as a predetermined irregular shape. Consequently, it is not possible for the cross-sectional profile that has been designed to exhibit stresses equally in the conventional coil spring with irregular cross section to make a cross-sectional profile that exhibits an equalized fatigue strength. That is, parts that exhibit lower fatigue strengths are present on the inner peripheral side of coil in the cross-sectional circumferential direction of the coil wire 80.

Moreover, in the conventional coil spring with irregular cross section, the vertical cross-sectional profile of the coil wire 80 has been designed with a small number of parameters for graphic generation. When the number of parameters for graphic generation is smaller, it is not possible to design the vertical cross-sectional profile while adjusting it finely. Consequently, in the conventional coil spring with irregular cross section, even when attempting to finely adjust the vertical cross-sectional profile after making considerations for the circumferential distribution in the degree of fatigue-strength improvement that results from a fatigue-strength improving treatment, it is not possible to cope with it fully.

The present invention is one which has been done in view of the aforementioned circumstances, and it is an assignment to provide a coil spring exhibiting fatigue strengths that are equalized more and higher along the cross-sectional circumferential direction of coil wire.

In order to make it possible to design a vertical cross-sectional profile while adjusting it finely, the present inventors newly created equations for vertical cross-sectional profile in which cross-sectional parameters are segmented. Moreover, the present inventors examined influences that fatigue-strength improving treatments exert on the distribution of surface stresses, and then found the distribution of degrees in fatigue-strength improvement in the cross-sectional circumferential direction of coil wires by means of experiments, and the like. And, while taking the resulting distribution of degrees in fatigue-strength improvement in the cross-sectional circumferential direction of coil wires into account, the present inventors investigated to compute parameter values in said new equations for vertical cross-sectional profile by finite element methods (or FEM); and then the present inventors designed the vertical cross-sectional profile of coil wires so as to approximate it to a cross-sectional profile with equalized fatigue strength, thereby completing the present invention. In addition, the present inventors ascertained that, of the vertical cross-sectional profile, a configuration on the outer peripheral side of coils does not affect so much on the distribution of surface stresses on the inner peripheral side of coils.

(1) A coil spring with irregular cross section according to the present invention that has been completed thusly is characterized in that:

it is a coil spring with irregular cross section, the coil spring being made by subjecting a coil wire having an irregular cross section to a fatigue-strength improving treatment including a shot peening treatment after coiling the coil wire into a spring configuration:

when being placed in a polar coordinate system comprising a pole, and a polar axis that extends from the pole toward a coil central axis in a coil radial direction, it has a vertical cross-sectional profile that is taken along in a coil axial direction of said coil wire, the vertical cross-section profile makes a substantially ellipse shape in which not only said pole makes the center but also said coil radial direction makes the major-diameter direction; and when labeling the major-diameter-side maximum diameter of said vertical cross-section profile "2LR," labeling the minor-diameter-side maximum diameter of said vertical cross-section profile "2SR," labeling a central offset coefficient in said major-diameter direction "$\Delta b$," and additionally when labeling an inner-side x-axis coefficient "nxr" and labeling an inner-side y-axis coefficient "nyr" in an orthogonal (or rectangular, or Cartesian) coordinate system in which said pole makes the origin and said polar axis is set in a positive area of the x-axis, said vertical cross-sectional profile has a coil inner-peripheral-side section that is expressed by following Equation (1) and Equation (2):

$$x = (LR - \Delta b)\cos^{nxr}\theta + \Delta b \quad (1)$$

$$y = SR \sin^{nyr}\theta \quad (2)$$

wherein $\theta$ is a deflection angle in said polar coordinate system; and $0° \leqq \theta < 90°$, $270° \leqq \theta < 360°$, $0.7 \leqq nxr \leqq 0.9$, $0.8 \leqq nyr \leqq 1.0$, and $0.1 SR \leqq \Delta b \leqq 0.3 SR$; in said Equation (1) and Equation (2).

Note herein that "said coil axial direction" means to be the central axis direction of coil spring with irregular cross section. Moreover, "said coil radial direction" means to be a direction that is perpendicular to the central axis direction of coil spring with irregular cross section.

"Said substantially ellipse shape" is not ellipse shapes that are defined geometrically, but is referred to configurations that can be approximated to ellipse shapes. The profile of this substantially ellipse shape is determined by the prescribed equations, and includes both of the following: those comprising curved portions alone; and those comprising curved portions and linear portions.

In the coil spring with irregular cross section according to the present invention, the inner-peripheral-side section in the vertical cross-sectional profile of the coil wire is expressed by said Equation (1) and Equation (2). Specifically, in the coil spring with irregular cross section according to the present invention, new equations that include three parameters, namely, the central offset coefficient "$\Delta b$," the inner-side x-axis coefficient "nxr" and the inner-side y-axis coefficient "nyr," are used in order to design the inner-peripheral-side section in the vertical cross-sectional profile. By means of this setting, it becomes feasible to design the coil inner-peripheral-side section in the vertical cross-sectional profile while adjusting it finely.

In consideration of influences that fatigue-strength improving treatments including shot peening treatments exert on the distribution of surface stresses, the central offset coefficient "$\Delta b$," the inner-side x-axis coefficient "nxr" and the inner-side y-axis coefficient "nyr" in said Equation (1) and Equation (2) are set up so as to fall in such ranges that the resulting fatigue strengths become to be more equalized and much higher in the cross-sectional circumferential direction of the coil inner-peripheral-side section.

Therefore, the coil spring with irregular cross section according to the present invention exhibits fatigue strengths that are equalized more and much higher in the inner-peripheral-side section of coil in one of the cross-sectional circumferential directions of the coil wire.

(2) It is preferable that, when labeling an outer-side x-axis coefficient "nxl" and labeling an outer-side y-axis coefficient "nyl" in said orthogonal coordinate system, said vertical cross-sectional profile can have a coil outer-peripheral-side section that is expressed by following Equation (3) and Equation (4):

$$x = -\{(LR - \Delta b)|\cos^{nxl}\theta| - \Delta b\} \quad (3)$$

$$y = SR \sin^{nyl}\theta \quad (4)$$

wherein $90° \leqq \theta < 270°$, $0.8 \leqq nxl \leqq 1.6$, and $0.3 \leqq nyl \leqq 0.6$ in said Equation (3) and Equation (4); and $\Delta b$ is equal to a value of $\Delta b$ in said Equation (1) and Equation (2).

In accordance with this constitution, a coil outer-peripheral-side section in the vertical cross-sectional profile of the coil wire is expressed by said Equation (3) and Equation (4). Specifically, new equations that include three parameters, namely, the central offset coefficient "$\Delta b$," the outer-side x-axis coefficient "nxl" and the outer-side y-axis coefficient "nyl," are used in order to design the coil outer-peripheral-side section in the vertical cross-sectional profile. By means of this setting, it becomes feasible to design the coil outer-peripheral-side section in the vertical cross-sectional profile while adjusting it finely.

Moreover, as described above, the following have been found out by means of the present inventors' experiments, and the like: of a coil wire's vertical cross-sectional profile, the outer-peripheral-side configuration of coil does not exert any influences on the distribution of surface stresses on the inner peripheral side of the coil so much. Hence, the three parameters in said Equation (3) and Equation (4), namely, the central offset coefficient "Δb," the outer-side x-axis coefficient "nxl" and the outer-side y-axis coefficient "nyl," are set up so as to fall in such a range that, of the vertical cross-sectional profile, the coil outer-peripheral-side section includes a straight line, or a line that approximates a straight line, partially. Specifically, the coil wire whose vertical cross-sectional profile has a coil outer-peripheral-side section that is expressed by above Equation (3) and Equation (4) comprises a flat face, or a face that is virtually flat. By means of this setting, the coil wire makes a coil wire whose vertical cross-sectional profile differs between the coil inner peripheral side and the coil outer peripheral side. Accordingly, in coiling this coil wire into a configuration of coil spring, it is possible to identify between a side that makes the "coil inner peripheral side" and another side that makes the "coil outer peripheral side" with ease; consequently, not only the efficiency of that operation upgrades, but also it is possible to securely manufacture coil springs with irregular cross sections that possess higher fatigue strengths.

In addition, the central offset coefficient "Δb," the outer-side x-axis coefficient "nxl" and the outer-side y-axis coefficient "nyl" in said Equation (3) and Equation (4) are set up so as to fall in such ranges that the resulting fatigue strengths become being more equalized and much higher in the cross-sectional circumferential direction of the coil outer-peripheral-side section. This coil spring with irregular cross section exhibits fatigue strengths that are equalized more and higher in the cross-sectional circumferential direction of the coil wire entirely.

(3) It is preferable that said vertical cross-sectional profile line can make a cross-sectional curve exhibiting an equalized fatigue strength or a cross-sectional curve exhibiting fatigue strengths that approximate an equalized fatigue strength, in ranges where said deflection angle falls in $10° \leq \theta \leq 70°$ and $290° \leq \theta \leq 350°$ at least.

Here, said "cross-sectional curve exhibiting fatigue strengths that approximate an equalized fatigue strength" is cross-sectional curves in which fatigue strengths are maintained within one of certain permissible ranges (e.g., ±10% from the average value).

(4) In the coil spring with irregular cross section according to the present invention, it is preferable that, when labeling a barycentric diameter of coil "D" and labeling a round-wire converted diameter of the coil "d,"

a spring index, "D/d," can be from 3.0 to 6.0.

(5) It is preferable that the coil spring with irregular cross section according to the present invention can be employed for a clutch damper in manual transmission for automobile, or a lockup damper in automatic transmission therefor.

BEST MODE FOR CARRYING OUT THE INVENTION

A coil spring with irregular cross section according to one of the present embodiment modes is one which is made by coiling a coil wire as the configuration of spring. A fatigue-strength improving treatment is carried out with respect to the resulting coil spring with irregular cross section that has been subjected to the coiling formation. Note that the "fatigue-strength improving treatment" is one that includes a shot peening treatment at least, and which can further comprise the other processing steps.

Figure 1:
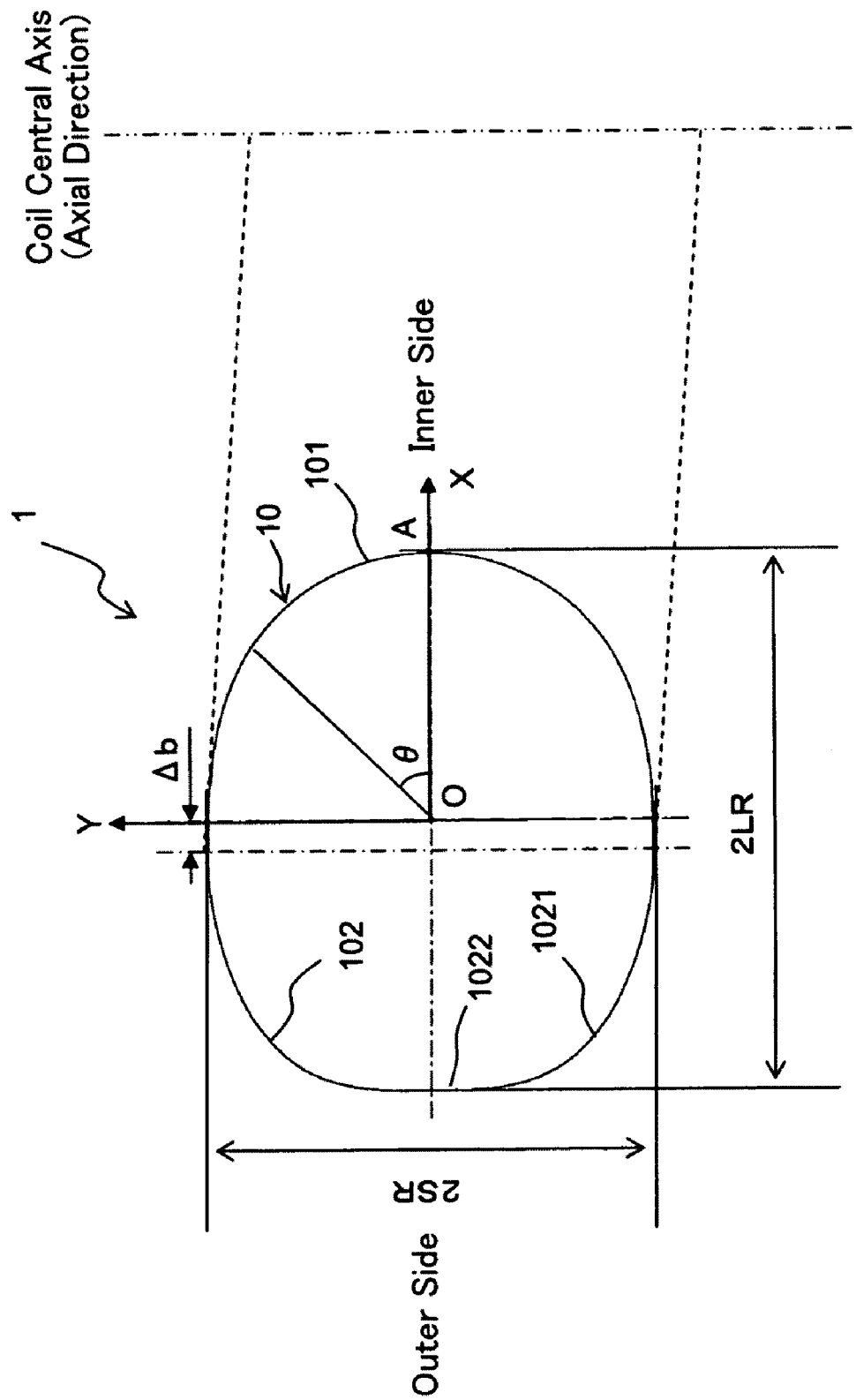
FIG. 1 is one in which a vertical cross-sectional profile of a coil spring with irregular cross section, which is directed to an embodiment, is illustrated by a polar coordinate system.

Moreover, a coil wire in the coil spring with irregular cross section according to the present embodiment mode has an irregular cross section. To be concrete, when being placed in a polar coordinate system comprising a pole "O" and a polar axis "OX" that extends from the pole "O" in a coil radial direction, a vertical cross-sectional profile 10 of a coil wire 1 in the coil spring with irregular cross section according to the present embodiment mode makes an elliptical shape substantially in which not only the pole "O" makes the center but also the coil radial direction makes the major-diameter direction, as illustrated in FIG. 1. Note that FIG. 1 is one which illustrates the vertical cross-sectional profile 10 that is taken along the coil axial direction of the coil wire 1 in the coil spring with irregular cross section according to the present embodiment mode.

Moreover, the vertical cross-sectional profile 10 of the coil wire 1 is equipped with an inner-peripheral-side section 101, and an outer-peripheral-side section 102; and the outer-peripheral-side section 102 is further equipped with two curved sections 1021, and a linear section 1022 that is formed between them and which is linear virtually.

When labeling the major-diameter-side maximum diameter of the vertical cross-section profile 10 "2LR," labeling the minor-diameter-side maximum diameter of the vertical cross-sectional profile 10 "2SR," labeling a central offset coefficient in the major-diameter direction "$\Delta b$" in said polar coordinate system; and additionally when labeling an inner-side x-axis coefficient "nxr" and labeling an inner-side y-axis coefficient "nyr" in an orthogonal coordinate system in which the pole "O" makes the origin and the polar axis "OX" is set in a positive section of the x-axis, the vertical cross-sectional profile 10 of the coil wire 1 in the coil spring according to the present embodiment mode has a coil inner-peripheral-side section 101 that is expressed by said Equation (1) and Equation (2).

Note herein that, in the coil spring with irregular cross section according to the present embodiment mode, the parameters are set as follows: $0° \leq \theta < 90°$; $270° \leq \theta < 360°$; $0.7 \leq nxr \leq 0.9$; $0.8 \leq nyr \leq 1.0$; and $0.1SR \leq \Delta b \leq 0.3SR$; in said Equation (1) and Equation (2).

By means of setting the inner-side x-axis coefficient "nxr," inner-side y-axis coefficient "nyr" and central offset coefficient "$\Delta b$" so as to fall in the aforementioned ranges, respectively, influences, which a fatigue-strength improving treatment that includes a shot peening treatment exerts on the distribution of surface stresses, are taken into consideration; consequently it is possible to set up fatigue strengths so that they are equalized more and become higher in the cross-sectional circumferential direction of the inner-peripheral-side section 101 of coil. Moreover, it is more preferable to be $0.7 \leq nxr \leq 0.85$, $0.9 \leq nyr \leq 1.0$; and $0.15SR \leq \Delta b \leq 0.25SR$.

Moreover, when labeling an outer-side x-axis coefficient "nxl" and labeling an outer-side y-axis coefficient "nyl" in the orthogonal coordinate system, the vertical cross-sectional profile 10 of the coil wire 1 in the coil spring with irregular cross section according to the present embodiment mode has an outer-peripheral-side section 102 of coil that is expressed by said Equation (3) and Equation (4).

Note herein that, in the coil spring with irregular cross section according to the present embodiment mode, the parameters are set as follows: $90° \leq \theta < 270°$; $0.8 \leq nxl \leq 1.6$; and $0.3 \leq nyl \leq 0.6$; in said Equation (3) and Equation (4); and $\Delta b$ is made equivalent to the value of $\Delta b$ in said Equation (1) and Equation (2).

By means of setting the outer-side x-axis coefficient "nxl" and outer-side y-axis coefficient "nyl" so as to fall in the aforementioned ranges, respectively, it is possible to set up fatigue strengths so that they are equalized more and become higher in the cross-sectional circumferential direction of the outer-peripheral-side section 102 of coil.

Figure 2:
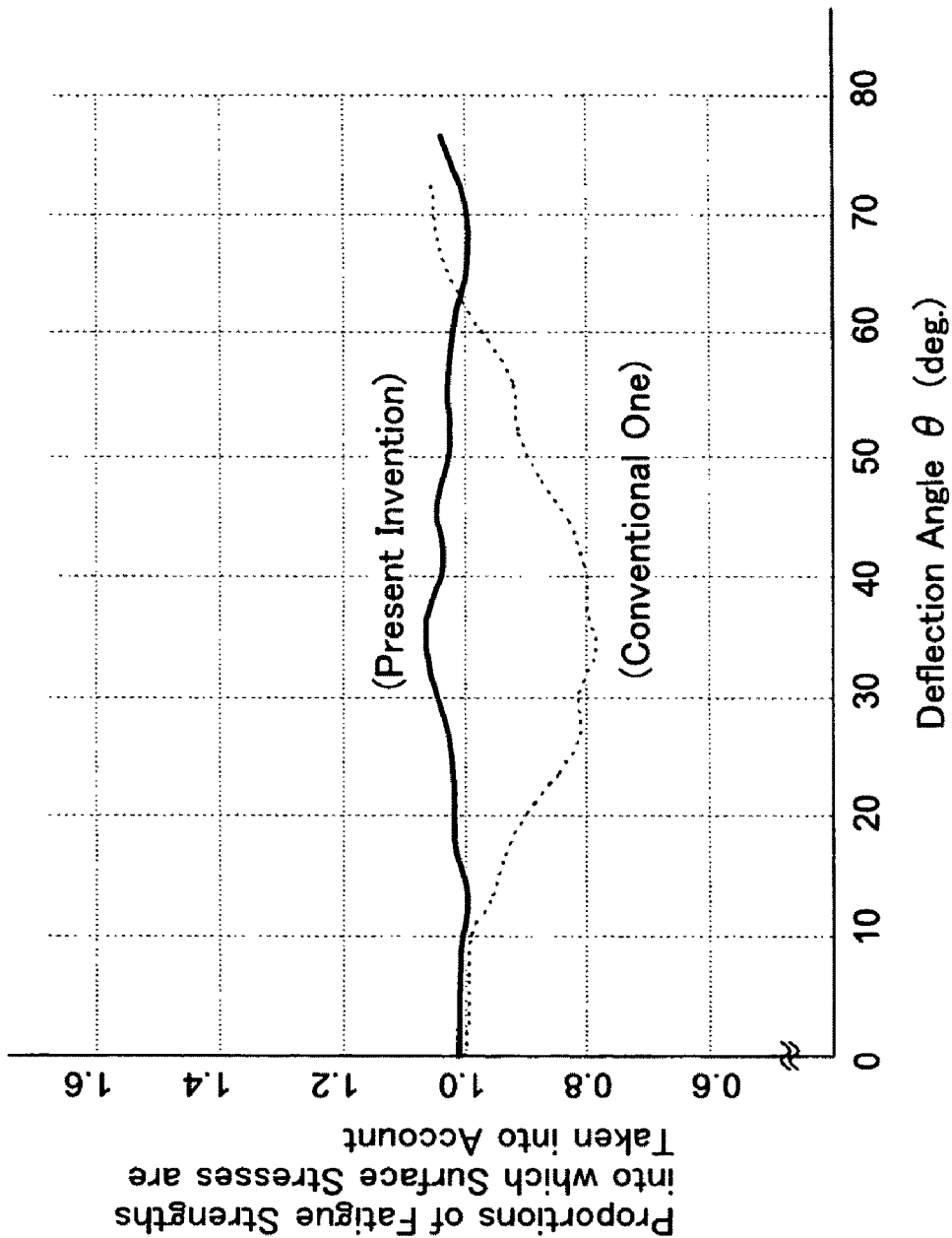
FIG. 2 is one in which a distribution of fatigue-strength proportions in which surface stresses in a conventional coil spring with irregular cross section after being subjected to a fatigue-strength improving treatment were taken into account is compared with another distribution of fatigue-strength proportions in which surface stresses in a coil spring with irregular cross section according to one of the present embodiment modes after being subjected to the fatigue-strength improving treatment were taken into account.

By means of thus setting up the five parameters, nxr, nyr, nxl, nyl and $\Delta b$, so as to fall in the aforementioned predetermined ranges, respectively, it is possible for the coil spring with irregular cross section according to the present embodiment mode to exhibit fatigue strengths, which are equalized more and become higher, over the circumferential direction of the vertical cross-sectional profile 10 of the coil wire 1 entirely. That is, by finely adjusting the vertical cross-sectional profile (or cross-sectional configuration) 10 of the coil wire 1, it is possible to reduce the adverse affects of fatigue-strength improving treatments with respect to surface stresses; consequently, as illustrated in FIG. 2, it is possible to materialize a coil spring with irregular cross section possessing fatigue strengths that are equalized more and become higher along the cross-sectional circumferential direction of the coil wire 1 in the coil spring with irregular cross section according to the present embodiment mode (being specified with the continuous line). FIG. 2 is one which compares proportions of fatigue strengths in which surface stresses are taken into account with regard to those of the coil spring with irregular cross section according to the present embodiment mode (being specified with the continuous line) and those of a conventional coil spring with irregular cross section (being specified with the dotted line). Note that the clause, "surface stresses are taken into account," in the phrase, "fatigue strengths in which surface stresses are taken into account," means taking changes of stresses in the cross-sectional circumferential direction into account; and the term, "surface stresses," herein means shear stresses that occur in the surface.

As illustrated in FIG. 2, in the conventional product (being specified with the dotted line), the proportions of fatigue strengths in which surface stresses are taken into account draw a trough shape, which has a root at around 40° when the deflection angle $\theta$ is present between 10° and 70°, on the circumference in the vertical cross-sectional profile of the coil wire.

Figure 9:
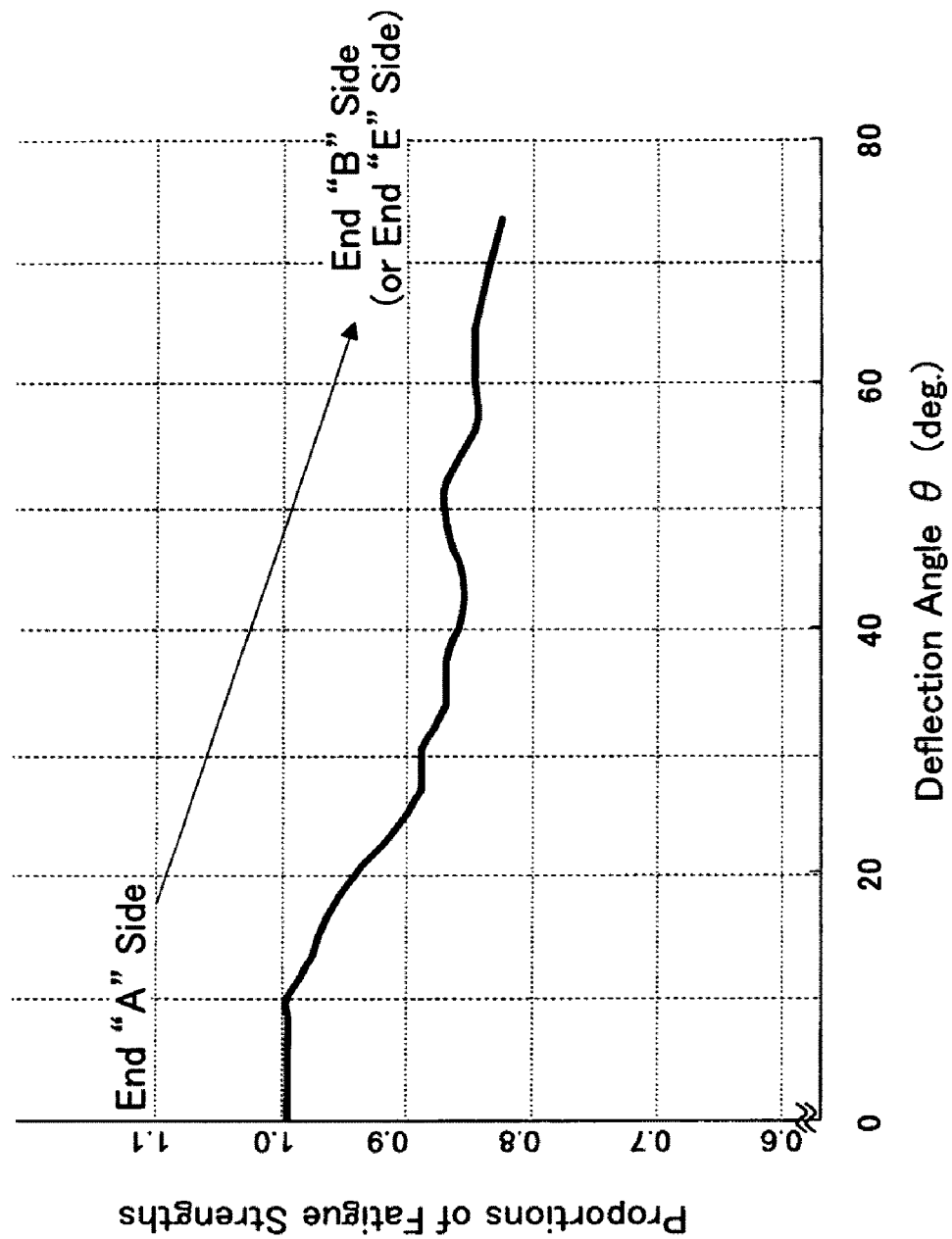
FIG. 9 is one which illustrates a distribution of fatigue-strength proportions in an ordinary coil spring after a fatigue-strength improving treatment had been performed onto the coil spring.

In the meantime, as also illustrated in FIG. 9, in the ordinary coil spring, the proportions of fatigue strengths decrease on the coil inner-peripheral side of the coil wire when the deflection angle $\theta$ becomes about 10° or more in the case of performing a fatigue-strength improving treatment, such as shot peening, thereto; especially, the proportions of fatigue strengths decrease sharply when the deflection angle $\theta$ falls in an interval of from 10° to and around 45°. As a result, in the conventional coil spring with irregular cross section, the decline in the proportions of fatigue strengths in which surface stresses are taken into account is likely to concentrate on a section exhibiting a deflection angle $\delta$ that is from at around 10° to and around 60° as shown in FIG. 2; especially, a tendency of the sharp decline can be seen when the deflection angle $\theta$ falls in a range of from at around 10° and up to 45° (being specified with the dotted line in FIG. 2).

On the contrary, in the coil spring with irregular cross section according to the present embodiment mode (being specified with the continuous line), the proportions of fatigue strengths into which surface stresses are taken into account, proportions which are equalized more in the circumferential direction, come to be obtainable over the cross-sectional circumferential direction entirely; in particular, in the inner-peripheral-side section 101 where $0° \leq \theta < 90°$ (likewise, in that where $270° \leq \theta < 360°$. Hence, the coil spring with irregular cross section according to the present embodiment mode exhibits fatigue strengths that are equalized more and become higher.

Figure 3:
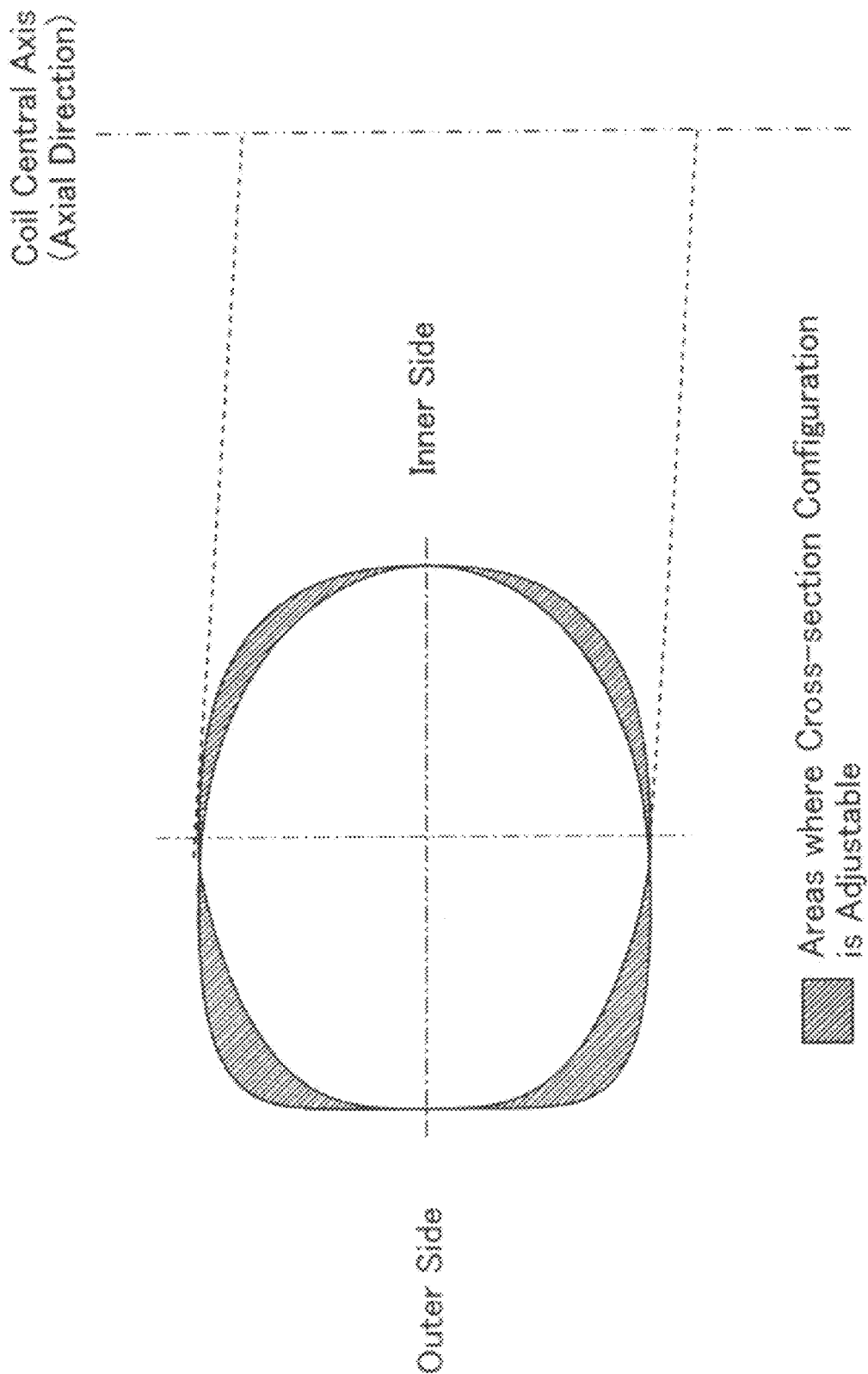
FIG. 3 is one which illustrates regions where a vertical cross-sectional profile of a coil spring with irregular cross section that is directed to one of the embodiments is adjustable.

Moreover, by means of using the aforementioned five parameters, it is possible to set up the vertical cross-sectional profile 10 of the coil wire 1 freely so that the distribution of surface stresses is equalized more and becomes higher, as being illustrated in FIG. 3, in the coil spring with irregular cross section according to the present embodiment mode. FIG. 3 shows an example of areas that are adjustable in the vertical cross-sectional profile 10 (or the cross-sectional configuration) of the coil wire 1 in the coil spring according to the present embodiment mode, areas which can be adjusted by means of setting up the aforementioned five parameters within the predetermined ranges.

To be concrete, as illustrated in FIG. 3, it is possible to maintain fatigue strengths, which are equalized more and become higher, in the inner-peripheral-side section 101 within the vertical cross-sectional profile 10 of the coil wire 1 by means of setting up the inner-side x-axis coefficient nxr, inner-side y-axis nyr and central offset coefficient Δb within the predetermined ranges, respectively, in the coil spring with irregular cross section according to the present embodiment mode; moreover, it is possible to freely adjust the linear section 1022 in the outer-peripheral-side section 102 of the vertical cross-sectional profile 10 in the length, and the like, by means of setting up the outer-side x-axis coefficient nxl and outer-side y-axis coefficient nyl within the predetermined ranges, respectively.

Moreover, the coil wire 1 in the coil spring with irregular cross section according the present embodiment mode has a flat face, or a face that is flat virtually, on the outer-peripheral side of coil by adjusting the outer-side x-axis coefficient nxl and outer-side y-axis coefficient nyl within the aforementioned ranges, respectively. By means of this setting, since the coil wire 1 comes to have a vertical cross-sectional configuration 10 whose configuration differs between the inner-peripheral side of coil and the outer-peripheral side of coil, it is possible to identify between a side "that makes the inner-peripheral side of coil" and another side "that makes the outer-peripheral side of coil" with ease in coiling the resulting coil wire 1 into a prescribed configuration of coil spring with irregular cross section, thereby not only upgrading the efficiency in that operation but also making it possible to manufacture coil springs with irregular cross section that possess higher fatigue strength.

Moreover, when labeling a barycentric diameter of coil in the coil spring with irregular cross section according to the present embodiment mode "D" and labeling a round-wire converted diameter of the coil "d," it is possible to set a spring index, "D/d," so as to be from 3.0 to 6.0. Note that the term, "barycentric diameter," refers to a coil diameter at the barycentric position in irregular cross section. In addition, the term, "round-wire converted diameter," refers to a diameter of perfect-circle wire whose cross-sectional area is identical with a cross-sectional area of irregular cross section.

Note herein that, when the spring index, "D/d," is 3.0 or less, the forming has become difficult because of processing problems; moreover, when the spring index, "D/d," is 6.0 or more, the effect of dispersing surface stresses that results from wire with irregular shape has faded; in addition, the proportions of the decline in fatigue strengths have come not to be available to such an extent as illustrated in FIG. 9.

The coil spring with irregular cross section according to the present embodiment mode can be manufactured by means of the following four steps, for instance. First of all, a fundamental configuration of a coil spring with irregular cross section is set up in advance. And, in order to examine influences that a fatigue-strength improving treatment exerts on the distribution of surface stresses, the distribution of fatigue-strength improving degrees in the cross-sectional circumferential direction of a coil wire is found by means of experiments, and the like. Next, values of the aforementioned respective parameters are investigated to calculate them from the resulting experimental data on the distribution of fatigue-strength improving degrees so that they fall within the predetermined ranges, respectively; and then a vertical cross-section profile of the coil wire is designed so that it approaches a cross-sectional curve exhibiting an equalized fatigue strength. A process for coiling is done using the coil wire with a vertical cross-sectional profile (or cross-sectional configuration) that has been designed eventually, and then the coil spring with irregular cross section is manufactured by means of further carrying out the fatigue-strength improving treatment.

Hereinafter, the aforementioned four steps in the manufacturing process for the coil spring according to the present embodiment mode will be explained more concretely.

First of all, since a fundamental configuration of a coil spring with irregular cross section is needed in order to manufacture the coil spring with irregular cross section, that fundamental configuration is determined in advance.

And, a coil wire 1 (whose cross-sectional configuration does not matter at all) is formed as said fundamental configuration by doing a process for coiling, and is thereby adapted into a coil spring for experiment. A fatigue-strength improving treatment, which is to be carried out in actually manufacturing the coil spring with irregular cross section, is performed onto the coil spring for experiment. The distribution of fatigue-strength improving degrees, which occurs due to overlapped conditions in the coil wire 1, is then examined. To be concrete, the distributions of surface stresses in the cross-sectional circumferential direction of the coil wire before and after performing the fatigue-strength improving treatment are found, respectively, and the distribution of proportions in fatigue strengths is found by means of the difference between them. Note that a method of examining the distribution of fatigue-strength improving degrees by means of experiment is employed herein; however, in addition to above, it is possible to employ a method of examining the proportions of fatigue strengths by means of simulations in personal computers, too, for instance.

Next, values of the parameters being used in Equation (1) through Equation (4) are optimized by means of finite element method (or FEM) in compliance with the resulting experimental data on the distribution of fatigue-strength improving degrees that results from the fatigue-strength improving treatment, and then the coil wire's vertical cross-sectional profile 10 is designed so that it approaches a cross-sectional curve exhibiting an equalized fatigue strength.

Finally, the resultant coil wire 1, which possesses a vertical cross-sectional profile 10 (or cross-sectional configuration) that has been designed eventually, is subjected to a process for coiling actually, and then the fatigue-strength improving treatment is carried out, thereby manufacturing the coil spring with irregular cross section.

The coil spring with irregular cross section according to the present embodiment mode, which is manufactured thusly, can preferably be employed for a clutch damper in manual transmission for automobile, or a lockup damper in automatic transmission therefor.

EMBODIMENTS

A vertical cross-sectional profile (or cross-sectional configuration) 10 of a coil wire 1 in a coil spring with irregular cross section according to one of the present embodiments is expressed by said Equation (1) through Equation (4) in the polar coordinate system that is shown in FIG. 1.

As illustrated in FIG. 1, the vertical cross-sectional profile 10 of the coil wire 1 in the coil spring according to the present embodiment is equipped with an inner-peripheral-side section 101, and an outer-peripheral-side section 102. Moreover, the outer-peripheral-side section 102 is equipped with two curved sections 1021, and a liner section 1022 that is formed between them and which is linear substantially.

Moreover, in the present embodiment, a coil wire 1 having a vertical cross-sectional profile that satisfies said Equation (1) through Equation (4) was subjected to a process for coiling, and then a shot peening treatment was carried out under given conditions, thereby forming coil springs.

Note that the conditions for the coiling process were those in which an oil tempered wire was used; a forming process for coiling was carried in cold; and a low-temperature annealing was further carried out in soaking at 450° C. for 30 minutes or more in order to remove residual stresses at the time of coiling. Moreover, the conditions for the shot peening treatment were those in which a low-temperature annealing was carried out in soaking at 225° C. for 15 minutes or more in order to recover the torsional yield point after carrying out a one-stage shot peening treatment with shots having a particle diameter of φ0.6 mm and exhibiting a hardness of 550 HV.

Based on the following respective embodiments, investigations were made on influences that the inner-side x-axis coefficient nxr, inner-side y-axis coefficient nyr, outer-side x-axis coefficient nxl, outer-side y-axis coefficient nyl and central offset coefficient Δb, namely, the parameters that are directed to aforementioned Equation (1) through Equation (4), exerted on the distribution of surface stresses in the cross-sectional circumferential direction of each of the coil wires 1.

(Embodiment Nos. 1 Through 6)

Figure 4:
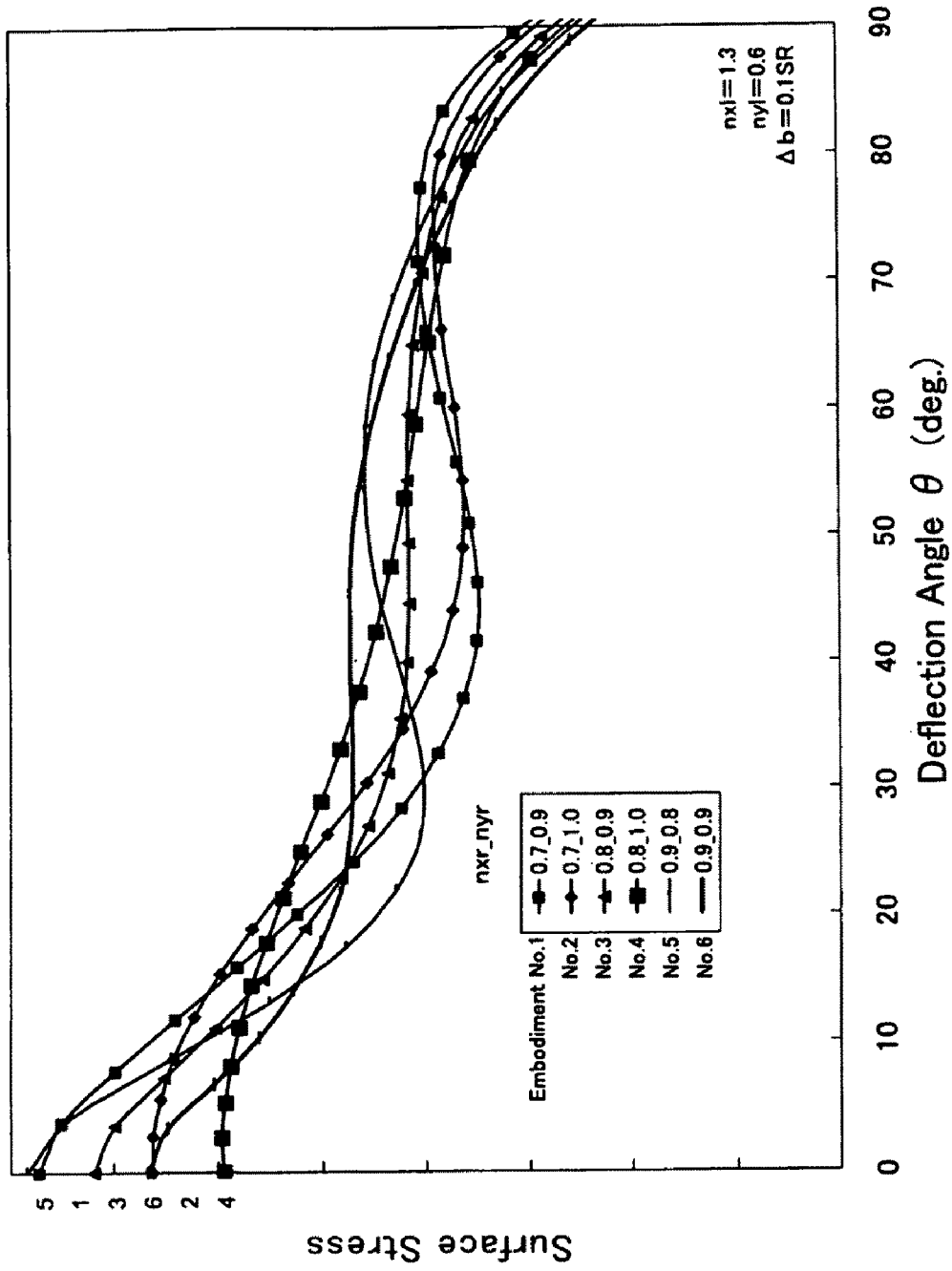
FIG. 4 is one which illustrates distributions of surface stresses in the coil inner-peripheral-side section within a vertical cross-sectional profile of a coil wire for each of coil springs with irregular cross section that are directed to the embodiments, respectively.

In Embodiment Nos. 1 through 6, the distributions of surface stresses in the coil wires 1 of the coil springs with irregular cross section were simulated with a personal computer (being shown in FIG. 4), respectively, while keeping the outer-side x-axis coefficient nxl, outer-side y-axis coefficient nyl and central offset coefficient Δb being fixed in said Equation (1) through Equation (4) but changing the inner-side x-axis coefficient nxr and inner-side y-axis coefficient nyr therein as given in Table 1. Note that FIG. 4 illustrates the thus simulated distributions of surface stresses in the inner-peripheral-side sections 101 within the vertical cross-sectional profiles 10 of the coil wires 1 according to Embodiment Nos. 1 through 6, respectively. These distributions of surface stresses are those which obtained regarding the coil wires upon completing the coiling process (or before the shot peening treatment).

TABLE 1

|  | nxr | nyr | nxl | nyl | Δb |
|---|---|---|---|---|---|
| Embodiment No. 1 | 0.7 | 0.9 | 1.3 | 0.6 | 0.1SR |
| Embodiment No. 2 | 0.7 | 1.0 | " | " | " |
| Embodiment No. 3 | 0.8 | 0.9 | " | " | " |
| Embodiment No. 4 | 0.8 | 1.0 | " | " | " |
| Embodiment No. 5 | 0.9 | 0.8 | " | " | " |
| Embodiment No. 6 | 0.9 | 0.9 | " | " | " |

As can be understood from Embodiment Nos. 1 through 6 shown in FIG. 4, tendencies of predetermined decrease in surface stresses on the cross-sectional circumference were obtained by means of setting the inner-side x-axis coefficient nxr so as to fall in a range of from 0.7 to 0.9 and setting the inner-side y-axis coefficient nyr so as to fall in a range of from 0.8 to 1.0 when the deflection angle θ was present in an interval of from at around 10° to at around 45°. Moreover, even when the deflection angle θ passed by 45°, curves (or the distributions of surface stresses) that were flat virtually were obtained. In particular, in Embodiment Nos. 1 through 4 in which the inner-side x-axis coefficient nxr was set to fall in a range of from 0.7 to 0.8 and the inner-side y-axis coefficient nyr was set to fall in a range of from 0.9 to 1.0, the surface stresses decreased gradually as the deflection angle θ increased when the deflection angle θ was present in an interval of from at around 10° to at around 45°. By means of performing a fatigue-strength improving treatment, such as shot peening, with respect to a coil wire 1 that possesses such a distribution of surface stresses upon completing a process for coiling, it was possible to inhibit the surface stresses from becoming uneven circumferentially in the coil-inner-periphery-side section of the coil wire 1; therefore, it was possible to obtain the proportions of fatigue strengths into which surface stresses that were more even in the circumferential direction were taken into account.

That is, it was possible to design coil springs with irregular cross section that exhibited the proportions of fatigue strengths that were more even in the circumferential direction, and into which surface stresses were taken into account, by means of the following: considering the difference between fatigue-strength improving degrees in the circumferential direction of the vertical cross-sectional profile 10 of the coil wire 1 (within the range of 10°<θ<45° especially) in advance, difference which resulted from a fatigue-strength improving treatment such as the shot peening; and then operating the vertical cross-sectional profile 10 (or the cross-sectional configuration) in each of the coil springs with irregular cross section finely using the inner-side x-axis coefficient nxr and inner-side y-axis coefficient nyr. Hence, it was possible to manufacture coil springs possessing fatigue strengths that were more even and higher. Moreover, in the coil springs with irregular cross section according to the present embodiments, the values of the proportions of fatigue strengths into which surface stresses were taken into account became being equalized virtually in the circumferential direction, as shown in FIG. 2, when the deflection angle θ fell in a range of from 10° to 70°.

COMPARATIVE EXAMPLE NOS. 1 THROUGH 11

Hereinafter, as comparative examples, namely, in the case of setting up the inner-side x-axis coefficient nxr and inner-side y-axis coefficient nyr outside the predetermined ranges, respectively, investigations were made on influences that these exerted on the distribution of surface stresses along the cross-sectional circumferential direction of their coil wires.

Figure 5:
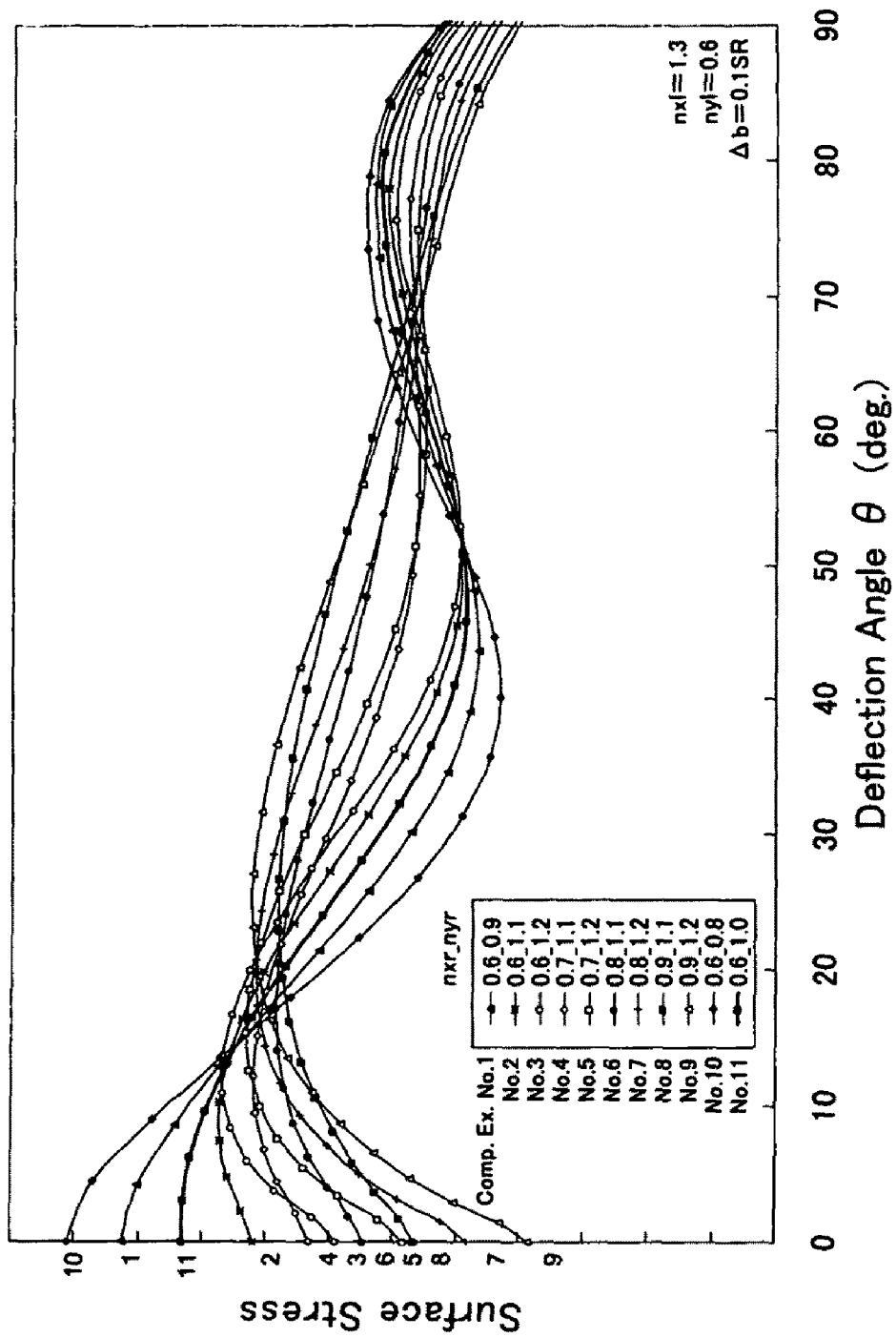
FIG. 5 is one which illustrates distributions of surface stresses in the coil inner-peripheral-side section within a vertical cross-sectional profile of each of coil springs with irregular cross section that are directed to comparative examples, respectively.

Although Comparative Example Nos. 1 through 11 were the same as Embodiment No. 1 basically, they were examples whose inner-side x-axis coefficient nxr and inner-side y-axis coefficient nyr were varied to fall outside the predetermined ranges, respectively. Note that, in Comparative Example No. 1 through 11, the distributions of surface stresses in the inner-peripheral-side section 101 within the coil wire 1 of the coil springs with irregular cross section were simulated with a personal computer (being shown in FIG. 5), respectively, while changing the nxr and nyr as given in Table 2. FIG. 5 illustrates the thus simulated distributions of surface stresses in the inner-peripheral-side sections 101 within the vertical cross-sectional profiles 10 of the coil wires 1 according to Comparative Example Nos. 1 through 11, respectively.

TABLE 2

|  | nxr | nyr | nxl | nyl | Δb |
|---|---|---|---|---|---|
| Comp. Ex. No. 1 | 0.6 | 0.9 | 1.3 | 0.6 | 0.1SR |
| Comp. Ex. No. 2 | 0.6 | 1.1 | " | " | " |
| Comp. Ex. No. 3 | 0.6 | 1.2 | " | " | " |
| Comp. Ex. No. 4 | 0.7 | 1.1 | " | " | " |
| Comp. Ex. No. 5 | 0.7 | 1.2 | " | " | " |
| Comp. Ex. No. 6 | 0.8 | 1.1 | " | " | " |
| Comp. Ex. No. 7 | 0.8 | 1.2 | " | " | " |
| Comp. Ex. No. 8 | 0.9 | 1.1 | " | " | " |
| Comp. Ex. No. 9 | 0.9 | 1.2 | " | " | " |
| Comp. Ex. No. 10 | 0.6 | 0.8 | " | " | " |
| Comp. Ex. No. 11 | 0.6 | 1.0 | " | " | " |

As can be understood from FIG. 5, in the coil springs with irregular cross section being designated at Comparative Example Nos. 2 through 9, the distributions of surface stresses tended to increase along the circumferential direction of the inner-peripheral-side section 101 within the vertical cross-sectional profile 10 of the coil wire 1 when the deflection angle θ fell within a range of from 10° to 20°. Accordingly, it was not possible to effectively equalize the proportions of surface strengths into which surface stresses were taken into account in the circumferential direction even when performing the shot peening treatment with respect to these coil springs with irregular cross section; consequently, they could not make any cross-sectional curve exhibiting an equalized fatigue strength (or exhibiting fatigue strengths that approximate an equalized fatigue strength) at all.

As can be understood from FIG. 5, in the coil springs with irregular cross section being designated at Comparative Example Nos. 1, 10 and 11, the distributions of surface stresses tended to decrease along the circumferential direction of the inner-peripheral-side section 101 within the vertical cross-sectional profile 10 of the coil wire 1 when the deflection angle θ fell within a range of from 10° to 45°; however, they tended to rise sharply when the deflection angle θ passed by 45°. Accordingly, it was not possible to effectively equalize the proportions of surface strengths into which surface stresses were taken into account in the circumferential direction even when performing the shot peening treatment with respect to these coil springs with irregular cross section; consequently, they could not make any cross-sectional curve exhibiting an equalized fatigue strength (or exhibiting fatigue strengths that approximate an equalized fatigue strength) at all.

As can be understood from Comparative Example Nos. 1 through 11 shown in FIG. 5, since Comparative Example Nos. 2 through 9 did not show any tendencies of decrease in surface stresses that started when the deflection angle δ was from at around 10°, they were disadvantageous for equalizing the proportions of fatigue strengths into which surface stresses after the fatigue-strength improving treatment were taken into account. Moreover, although Comparative Example Nos. 1, 10 and 11 exhibited the distributions that tended to decrease when the deflection angle θ was from at around 10°, respectively; since they exhibited the distributions of surface stresses that tended to rise sharply when the deflection angle θ passed by 45°, respectively; they were likewise disadvantageous for equalizing the proportions of fatigue strengths into which surface stresses after the fatigue-strength improving treatment were taken into account.

In addition, the surface stresses became likely to tend to rise sharply when the inner-side x-axis nxr was smaller than 0.7, if the deflection angle δ passed by 45°; whereas the proportions of fatigue strengths into which surface stresses were taken into account became likely to tend to lower too much when the inner-side x-axis nxr was larger than 0.9, if the deflection angle θ was at around 0°.

When observing Comparative Example Nos. 1 through 11 shown in FIG. 5 and Embodiment Nos. 1 through 6 shown in FIG. 4 to compare them with each other, since the distributions of surface strengths on the inner-peripheral side of the coil springs according to Embodiment Nos. 1 through 6 came to show predetermined declining tendencies, respectively, when the deflection angle θ was present from at around 10° to and around 45°; and since the distributions did not come to show any tendencies that rose sharply even when the deflection angle θ passed by 45°; it was possible to see that Embodiment Nos. 1 through 6 were advantageous for equalizing the proportions of fatigue strengths into which surface stresses after the fatigue-strength improving treatment were taken into account.

(Embodiment Nos. 7 Through 9)

Embodiment Nos. 7 through 9 were the same as Embodiment No. 1 basically, but were examples whose inner-side x-axis coefficient nxr and inner-side y-axis coefficient nyr were fixed at 0.75 and 1.0, respectively, and whose setting on the central offset Δb was varied.

In Embodiment Nos. 7 through 9, the distributions of surface stresses in the inner-peripheral-side section 101 within the coil wire 1 of the coil springs with irregular cross section were simulated with a personal computer (being shown in FIG. 6), respectively, after the Δb had been varied as given in Table 3. Note that FIG. 6 illustrates the thus simulated distributions of surface stresses in the inner-peripheral-side sections 101 within the vertical cross-sectional profiles 10 of the coil wires 1 according to Embodiment Nos. 7 through 9, respectively.

TABLE 3

|  | nxr | nyr | nxl | nyl | Δb |
|---|---|---|---|---|---|
| Embodiment No. 7 | 0.75 | 1.0 | 1.3 | 0.6 | 0.1SR |
| Embodiment No. 8 | " | " | " | " | 0.2SR |
| Embodiment No. 9 | " | " | " | " | 0.3SR |

Figure 6:
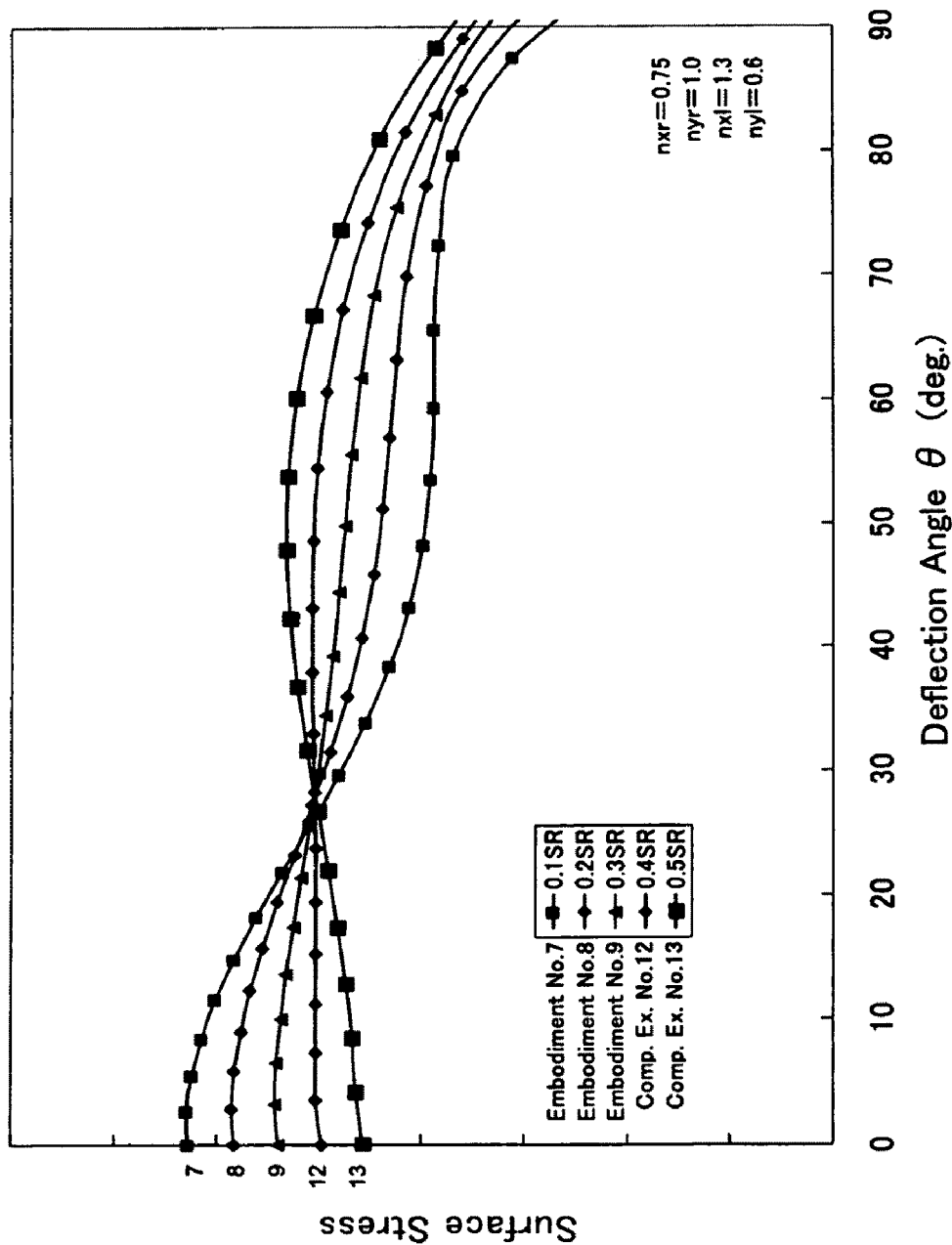
FIG. 6 is one which illustrates influences that the central offset coefficient "Δb" of each of the coil springs that are directed to the embodiments and comparative examples exerts on the distributions of surface stresses in the inner peripheral side of the coil springs with irregular cross section, respectively.

As can be understood from FIG. 6, in the coil springs with irregular cross section according to Embodiment Nos. 7 through 9, the distributions of surface stresses tended to decrease along the circumferential direction of the inner side within the vertical cross-sectional profile 10 of the coil wire 1 when the deflection angle θ fell within a range of from 10° to 45°. Moreover, it is possible to see that the surface stress when the deflection angle θ was at around 45° was lower than the surface stress when the deflection angle θ was at around 0°. Accordingly, it is possible to facilitate the effective upgrading on the proportions of fatigue strengths into which surface stresses resulting from shot peening treatments are taken into account by means of setting up the central offset coefficient Δb within the prescribed range; consequently it is possible to make fine adjustments with respect to the vertical cross-sectional profile 10 of the coil wire 1 regarding the proportions of fatigue strengths into which surface stresses are taken into account so that it turns into a cross-sectional curve exhibiting an equalized fatigue strength (or exhibiting fatigue strengths that approximate an equalized fatigue strength).

COMPARATIVE EXAMPLE NOS. 12 AND 13

Hereinafter, explanations will be made on comparative examples in which the Δb was set up outside the predetermined range and then the simulation was carried out.

Comparative Example Nos. 12 and 13 were the same as Embodiment Nos. 7 through 9 basically, but were examples whose setting on the central offset coefficient Δb was varied.

In Comparative Examples Nos. 12 and 13, the distributions of surface stresses in the inner-peripheral-side section 101 within the coil wire 1 of the coil springs with irregular cross section were simulated with a personal computer (being shown in FIG. 6), respectively, after the Δb had been varied as given in Table 4.

TABLE 4

|  | nxr | nyr | nxl | nyl | Δb |
|---|---|---|---|---|---|
| Comp. Ex. No. 12 | 0.75 | 1.0 | 1.3 | 0.6 | 0.4SR |
| Comp. Ex. No. 13 | " | " | " | " | 0.5SR |

As can be understood from FIG. 6, the coil springs with irregular cross section according to Comparative Example Nos. 12 and 13 did not show any prescribed tendencies of decrease in surface stresses along the circumferential direction of the inner side within the vertical cross-sectional profile 10 of the coil wire 1 when the deflection angle θ fell within a range of from 10° to 45°. Moreover, it is possible to see that the surface stress when the deflection angle θ was at around 45° was higher than the surface stress when the deflection angle θ was at around 0°. Accordingly, in these coil springs with irregular cross section, no effective upgrading became obtainable on the proportions of fatigue strengths into which surface stresses resulting from shot peening treatments were taken into account; consequently they could not turn into any cross-sectional curve exhibiting an equalized fatigue strength (or exhibiting fatigue strengths that approximated an equalized fatigue strength).

Moreover, as can be understood when Embodiment Nos. 7 through 9 shown in FIG. 6 are compared with Comparative Example Nos. 12 and 13 shown therein, the vertical cross-sectional profile 10 (or cross-sectional configuration) of the coil wires 1 was adjusted by adjusting the central offset coefficient Δb within the predetermined range, and thereby it was possible to finely correct to what extent the curve of surface strengths declined.

On the contrary, the central offset coefficient Δb that exceeded 0.3SR was disadvantageous for equalizing the proportions of fatigue strengths into which surface stresses after the fatigue-strength improving treatment were taken into account, because the surface stress when the deflection angle θ was at around 45° became greater than the surface stress when the deflection angle was at around 0°.

(Embodiment Nos. 10 Through 18)

In Embodiment Nos. 10 through 18, the distributions of surface stresses in the coil wires 1 of the coil springs with irregular cross section were simulated with a personal computer (being shown in FIG. 7), respectively, while keeping the inner-side x-axis coefficient nxr, inner-side y-axis coefficient nyr and central offset coefficient Δb being fixed in said Equation (1) through Equation (4) but changing the outer-side x-axis coefficient nxl and outer-side y-axis coefficient nyl therein as given in Table 5. Note that FIG. 7 illustrates the thus simulated distributions of surface stresses in the outer-peripheral-side sections 102 within the vertical cross-sectional profiles 10 of the coil wires 1 according to Embodiment Nos. 10 through 18, respectively.

TABLE 5

|  | nxr | nyr | nxl | nyl | Δb |
|---|---|---|---|---|---|
| Embodiment No. 10 | 0.75 | 1.0 | 0.8 | 0.3 | 0.1SR |
| Embodiment No. 11 | " | " | 1.0 | 0.3 | " |
| Embodiment No. 12 | " | " | 1.2 | 0.3 | " |
| Embodiment No. 13 | " | " | 1.4 | 0.3 | " |
| Embodiment No. 14 | " | " | 1.6 | 0.3 | " |
| Embodiment No. 15 | " | " | 0.8 | 0.5 | " |
| Embodiment No. 16 | " | " | 1.0 | 0.5 | " |
| Embodiment No. 17 | " | " | 1.2 | 0.5 | " |
| Embodiment No. 18 | " | " | 1.4 | 0.5 | " |

Figure 7:
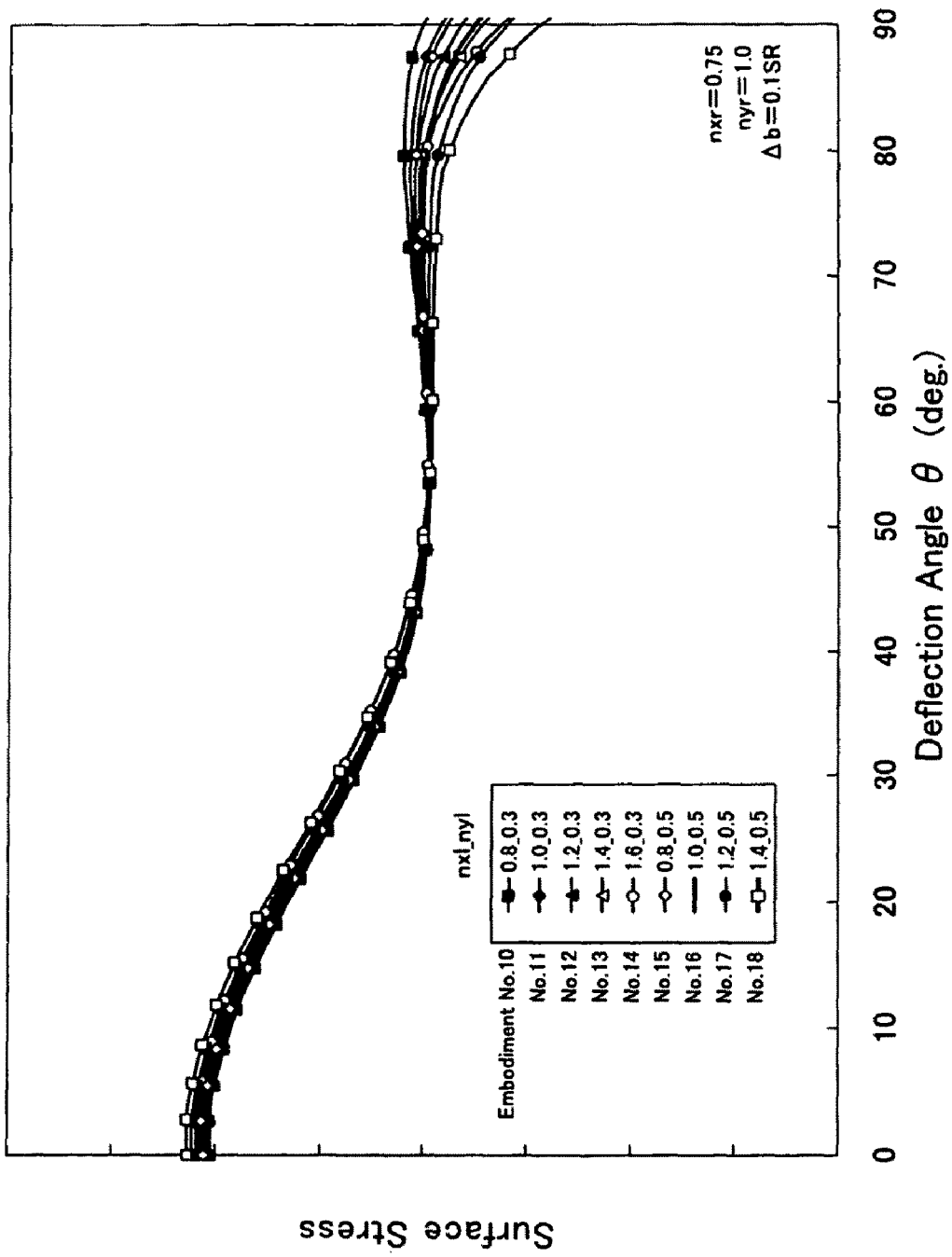
FIG. 7 is one which illustrates influences that the outer-side x-axis coefficient "nxl" and outer-side y-axis coefficient "nyl" of each of the coil springs that are directed to the embodiments exert on the distributions of surface stresses in the inner peripheral side of the coil springs with irregular cross section, respectively.
Figure 8:
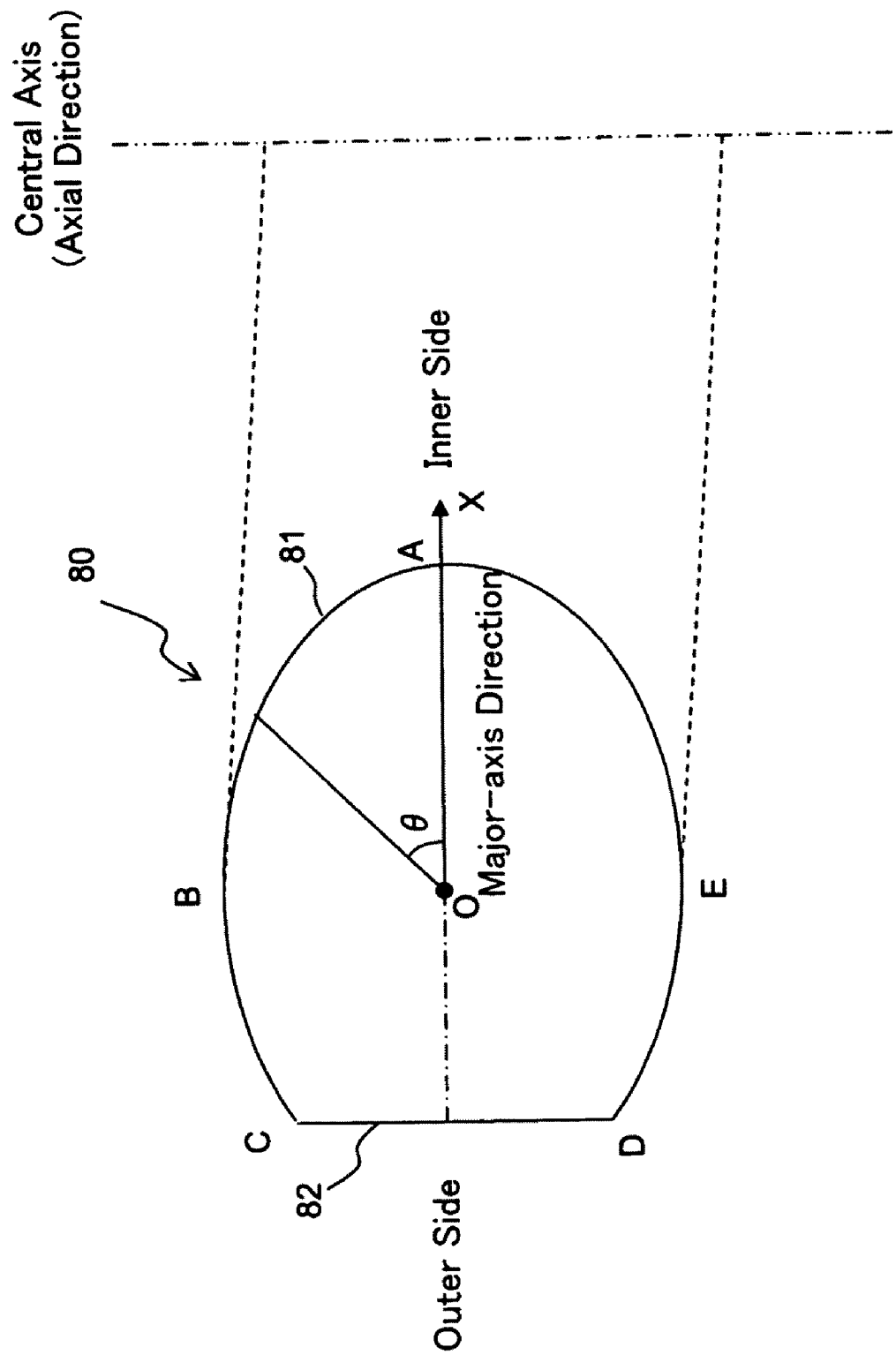
FIG. 8 is one which illustrates a vertical cross section of a conventional coil spring with "irregular cross section"

As can be understood from FIG. 7, it is possible to see that, in the coil springs with irregular cross section according to Embodiment Nos. 10 through 18, the outer-side x-axis coefficient nxl and outer-side y-axis coefficient nyl did not have any influence so much on the distributions of surface stresses in the outer-peripheral-side sections 102 within the vertical cross-sectional profiles 10 in the circumferential direction of the vertical cross-sectional profiles 10 of the coil wire 1. Note that it is possible to determine the configuration of the outer-peripheral-side section 102 within the vertical cross-sectional profile 10 of a coil wire by means of setting up the nxl and nyl.

As can be understood from Embodiment Nos. 10 through 18 shown in FIG. 7, it is possible to finely adjust the distribution of surface stresses on the outer peripheral side by means of changing the outer-side x-axis coefficient nxl and outer-side y-axis coefficient nyl. Moreover, as being illustrated in FIG. 3 as well, it is possible to change the line shape of the outer-peripheral-side section 102 within the vertical cross-sectional profile 10 of the coil wire 1 from a curved line and then set it up as a straight line, or a line shape that approximates a straight line, by means of adjusting the outer-side x-axis coefficient nxl and outer-side y-axis coefficient nyl. This setting can make the coil wire 1 have the vertical cross-sectional profile 10 whose configuration differs between the coil inner-peripheral side 101 and the coil outer-peripheral side 102. Accordingly, it is possible to identify between a side "making the coil inner-peripheral side" and the other side "making the coil outer-peripheral side" with ease when coiling the resulting coil wire 1 into the configuration of coil spring; consequently, the production efficiency of coil spring with irregular cross section upgrades.

Thus, it is possible to finely adjust the inner-peripheral-side section 101 within the vertical cross-sectional profile (or cross-sectional configuration) of the coil wire 1 by means of properly setting up the inner-side x-axis coefficient nxr, inner-side y-axis coefficient nyr and central offset coefficient Δb from the origin in the prescribed ranges, respectively. Moreover, it is possible to finely adjust the outer-peripheral-side section 102 within the vertical cross-sectional profile 10 of the coil wire 1 by means of properly setting up the outer-side x-axis coefficient nxl, outer-side y-axis coefficient nyl and central offset coefficient Δb in the prescribed ranges, respectively. By means of these settings, it was possible for the coil springs with irregular cross section according to the present embodiments to exhibit fatigue strengths that were equalized more in the cross-sectional circumferential direction of the coil wires 1, and which were much higher; accordingly, the occurrence of breakages, which resulted from the heightening of surface stresses on the coil inner-peripheral side, could be inhibited effectively; consequently, the fatigue life of coil spring could get longer.

INDUSTRIAL APPLICABILITY

The coil spring with irregular cross section according to the present invention can be used for a clutch damper in manual transmission for automobile, or a lockup damper in automatic transmission therefor, and the like, suitably.

The invention claimed is:

1. A spring comprising:
    a coil spring having an irregular cross section, the coil spring being made by subjecting a coil wire having an irregular cross section to a fatigue-strength improving treatment including a shot peening treatment after coiling the coil wire into a spring configuration of a polar coordinate system having a pole, and a polar axis extending from the pole toward a coil central axis in a coil radial direction, and having a vertical cross-sectional profile taken along in a coil axial direction of said coil wire, the vertical cross-sectional profile forming a substantially ellipse shape in which not only said pole has the central axis but also said coil radial direction has a major-diameter direction; and labeling a major-diameter-side maximum diameter of said vertical cross-sectional profile "2LR", labeling a minor-diameter-side maximum diameter of said vertical cross-sectional profile "2SR", labeling a central offset coefficient in said major-diameter direction "$\Delta b$," and additionally labeling an inner-side x-axis coefficient "nxr" and labeling an inner-side y-axis coefficient "nyr" in an orthogonal coordinate system in which said pole makes an origin and said polar axis being set in a positive area of an x-axis, said vertical cross-sectional profile having a coil inner-peripheral-side section expressed by following Equation (1) and Equation (2):

$$x = (LR - \Delta b)\cos^{nxr}\theta + \Delta b \qquad (1)$$

$$y = SR \sin^{nyr}\theta \qquad (2)$$

wherein $\theta$ is a deflection angle in said polar coordinate system, and $0° \leq \theta < 90°$, $270° \leq 360°$, $0.7 \leq nxr \leq 0.9$, $0.8 \leq nyr \leq 1.0$, and $0.1 SR \leq \Delta b \leq 0.3 SR$, in said Equation (1) and Equation (2).

2. The spring as set forth in claim 1, wherein an outer-side x-axis coefficient is labeled "nxl" and an outer-side y-axis coefficient is labeled "nyl" in said orthogonal coordinate system, said vertical cross-sectional profile has a coil outer-peripheral-side section that is expressed by following Equation (3) and Equation (4):

$$x = -\{(LR - \Delta b)\square \cos^{nxl}\theta\square - \Delta b\} \qquad (3)$$

$$y = SR \sin^{nyl}\theta \qquad (4)$$

wherein $90° \leq \theta < 270°$, $0.8 \leq nxl \leq 1.6$, and $0.3 \leq nyl \leq 0.6$ in said Equation (3) and Equation (4); and $\Delta b$ is equal to a value of $\Delta b$ in said Equation (1) and Equation (2).

3. The spring as set forth in claim 1, wherein said vertical cross-sectional profile line makes a cross-sectional curve exhibiting an equalized fatigue strength or a cross-sectional curve exhibiting fatigue strengths that approximate an equalized fatigue strength, in ranges where said deflection angle falls in at least $10° \leq \theta \leq 70°$ and $290° \leq \theta \leq 350°$.

4. The spring as set forth in claim 1, wherein a barycentric diameter of coil is labeled "D" and a round-wire converted diameter of the coil is labeled "d", and a spring index, "D/d", is from 3.0 to 6.0.

5. The spring as set forth in claim 1 wherein the coil spring is a clutch damper in a manual transmission for an automobile, or a lockup damper in an automatic transmission for an automobile.

* * * * *

UNITED STATES PATENT AND TRADEMARK OFFICE
CERTIFICATE OF CORRECTION

PATENT NO. : 8,393,602 B2
APPLICATION NO. : 12/736596
DATED : March 12, 2013
INVENTOR(S) : Isobe et al.

It is certified that error appears in the above-identified patent and that said Letters Patent is hereby corrected as shown below:

In the Claims:

Column 18, line 8, should be changed from " $x = -\{LR - \Delta b\} \square \cos^{nx!}\theta_\square - \Delta b\} \ldots (3)$ " to -- $x = -\{(LR - \Delta b) | \cos^{nx!}\theta | - \Delta b\} \ldots (3)$ --

Signed and Sealed this
Eleventh Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,393,602 B2  
APPLICATION NO. : 12/736596  
DATED : March 12, 2013  
INVENTOR(S) : Isobe et al.

Page 1 of 1

It is certified that error appears in the above-identified patent and that said Letters Patent is hereby corrected as shown below:

In the Claims:

Column 17, line 26, should be changed from "system, and $0° \leqq \theta < 90°$, $270° \leqq 360°$, $0.7 \leqq nxr \leqq 0.9$," to --system, and $0° \leqq \theta < 90°$, $270° \leqq \theta < 360°$, $0.7 \leqq nxr \leqq 0.9$,--

Signed and Sealed this  
Thirteenth Day of May, 2014

Michelle K. Lee  
*Deputy Director of the United States Patent and Trademark Office*